US008079691B2

(12) United States Patent
Koehler et al.

(10) Patent No.: US 8,079,691 B2
(45) Date of Patent: Dec. 20, 2011

(54) FOAM PLATE FOR REDUCING FOAM IN A PRINTHEAD

(75) Inventors: David Roland Koehler, Sherwood, OR (US); David Paul Platt, Newberg, OR (US); Edward F. Burress, West Linn, OR (US)

(73) Assignee: Xerox Corporation, Norwalk, CT (US)

(*) Notice: Subject to any disclaimer, the term of this patent is extended or adjusted under 35 U.S.C. 154(b) by 355 days.

(21) Appl. No.: 12/367,583

(22) Filed: Feb. 9, 2009

(65) Prior Publication Data

US 2010/0201764 A1 Aug. 12, 2010

(51) Int. Cl.
*B41J 2/175* (2006.01)
*B41J 2/17* (2006.01)
*G01D 11/00* (2006.01)

(52) U.S. Cl. ................. 347/88; 347/99; 347/84; 347/85

(58) Field of Classification Search ........................ None
See application file for complete search history.

(56) References Cited

U.S. PATENT DOCUMENTS 4,251,824 A * 2/1981 Hara et al. ...................... 347/57
5,276,468 A * 1/1994 Deur et al. ...................... 347/17
6,357,867 B1 * 3/2002 Hine ............................... 347/89
7,063,410 B2 * 6/2006 Slotto et al. ..................... 347/86
7,137,692 B2 * 11/2006 Sonnichsen et al. ............ 347/88
7,264,343 B2 * 9/2007 Harvey et al. ................... 347/93
7,300,143 B2 11/2007 Slotto et al.
2004/0114008 A1 * 6/2004 Leighton et al. ................ 347/88
2007/0002107 A1 * 1/2007 Leighton .......................... 347/88
2007/0273737 A1 * 11/2007 Uezawa .......................... 347/92
2008/0122901 A1 5/2008 Platt et al.
2008/0122912 A1 5/2008 Platt et al.
2008/0129808 A1 6/2008 Platt et al.

FOREIGN PATENT DOCUMENTS

EP 1552936 7/2005
JP 2002361893 A * 12/2002

OTHER PUBLICATIONS

European Search Report corresponding to European Patent Application 10152858.6, European Patent Office, Munich Germany, May 28, 2010 (5 pages).

* cited by examiner

*Primary Examiner* — Stephen Meier
*Assistant Examiner* — Leonard S Liang
(74) *Attorney, Agent, or Firm* — Maginot, Moore & Beck, LLP

(57) ABSTRACT

A reservoir assembly for use in an imaging device, the reservoir assembly includes an ink input port configured to receive liquid ink from an ink source and an ink tank configured to receive ink from the input port. A filter is positioned between the input port and the ink tank configured to filter ink received via the input port prior to reaching the ink tank. The reservoir assembly includes a foam reducing path configured to guide ink that passes through the filter to the ink tank, the foam reducing path having a varying cross-sectional size and/or shape configured to collapse, compress, stretch, and/or shear air bubbles in foam that passes through the filter prior to reaching the ink tank.

15 Claims, 7 Drawing Sheets

FOAM PLATE FOR REDUCING FOAM IN A PRINTHEAD

TECHNICAL FIELD

This disclosure relates generally to phase change ink jet imaging devices, and, in particular, to methods and devices for reducing foam in printheads used in such imaging devices.

BACKGROUND

Solid ink or phase change ink printers conventionally receive ink in a solid form, either as pellets or as ink sticks. The solid ink pellets or ink sticks are typically inserted through an insertion opening of an ink loader for the printer, and the ink sticks are pushed or slid along the feed channel by a feed mechanism and/or gravity toward a solid ink melting assembly. The melting assembly melts the solid ink into a liquid that is delivered to a melted ink container. The melted ink container is configured to hold a quantity of melted ink and to communicate the melted ink to one or more printhead reservoirs located proximate at least one printhead of the printer as needed. This melted ink container could be located on the melting assembly between it and the printhead(s) or could be part of the head reservoir.

In some printing systems, the remote ink containers are configured to communicate melted phase change ink held therein to the printhead reservoirs through an ink delivery conduit or tube that extends between the ink containers and the printhead reservoir(s). The ink is transmitted through the ink delivery conduit by introducing a positive pressure in the ink container which causes the ink in the containers to enter the delivery conduit and travel to the printhead reservoir(s). Once the pressurized ink reaches the printhead reservoir, it is typically passed through a filter before reaching an on-board chamber or tank where the ink is held and delivered as needed to the ink jets of the printhead.

One difficulty faced in using pressurized ink delivery to communicate melted phase change ink to the printhead reservoirs is foam formation in the printhead reservoirs. For example, when the printer is turned off or enters a sleep mode, the molten ink that remains in the ink containers, conduits, and printhead reservoirs can solidify, or freeze. When the printer is subsequently powered back on or wakes from the sleep mode, air that was once in solution in the ink can come out of solution to form air bubbles or air pockets in the ink containers, conduits, and printhead reservoirs. During pressurized ink delivery, air trapped in the ink containers, conduits, and printhead reservoirs may be forced through printhead reservoir filters along with molten ink creating foam. The foam poses three problems: 1) it can completely fill the volume above the nominal maxim liquid ink level in the on-board ink tanks of the printhead and lead to color mixing and/or clogged vent lines, 2) it can create a false "full" reading at the level sense probes because it occupies a larger volume than liquid ink, and 3) it can potentially become entrained in the ink flow path to the ink jets and cause ink jetting malfunction, typically termed Intermittent Weak and Missing jets (IWM's).

SUMMARY

In order to reduce the foam that may form in a printhead reservoir as a result of pressurized ink delivery through a filter wetted by ink, an additional feature in a reservoir assembly for use in a phase change ink imaging device is provided. In one embodiment, the reservoir assembly includes a back plate having an ink input port configured to receive liquid ink under pressure from an ink source and a front plate including an ink tank configured to hold ink received from the ink source and to communicate the ink to a printhead. A first plate is bonded to the back plate. The first plate and the back plate enclose a filter chamber therebetween. The filter chamber is configured to receive ink via the ink input port and to direct the received ink to an ink supply path opening in the first plate having a first cross-sectional area. The filter chamber includes at least one filter positioned between the ink input port and the ink supply path opening in the first plate. A second plate is bonded between the first plate and the front plate. The second plate includes an ink supply path opening that aligns with the ink supply path opening in the first plate. The ink supply path opening in the second plate has a second cross-sectional area, the second cross-sectional area being less than the first cross-sectional area.

In another embodiment, a reservoir assembly for use in a phase change ink imaging device includes a back plate including an ink input port configured to receive liquid ink from an ink source; and a front plate including an ink tank configured to hold ink received from the ink source and to communicate the ink to a printhead. A foam plate is positioned between the front plate and the back plate. The foam plate and the back plate enclose a filter chamber therebetween. The filter chamber is configured to receive ink via the ink input port, the foam plate including a thin channel exiting at a slit configured to constrict a flow of ink foam from the filter chamber to the ink tank thus collapsing a majority of the bubbles. The filter chamber includes at least one filter positioned between the ink input port and the slit in the foam plate.

BRIEF DESCRIPTION OF THE DRAWINGS

The foregoing aspects and other features of the present disclosure are explained in the following description, taken in connection with the accompanying drawings, wherein.

DETAILED DESCRIPTION

Figure 1:
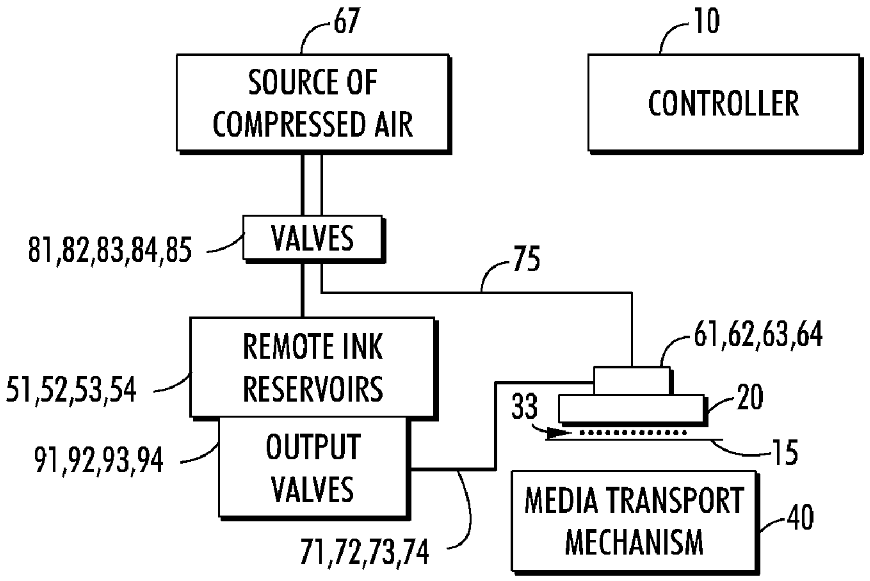
FIG. 1 is a schematic block diagram of an embodiment of an ink jet printing apparatus that includes on-board ink reservoirs.

For a general understanding of the present embodiments, reference is made to the drawings. In the drawings, like reference numerals have been used throughout to designate like elements.

As used herein, the term "imaging device" generally refers to a device for applying an image to print media. "Print media" can be a physical sheet of paper, plastic, or other suitable physical media or substrate for images, whether precut or web fed. The imaging device may include a variety of other components, such as finishers, paper feeders, and the like, and may be embodied as a copier, printer, or a multifunction machine. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like.

Figure 3:
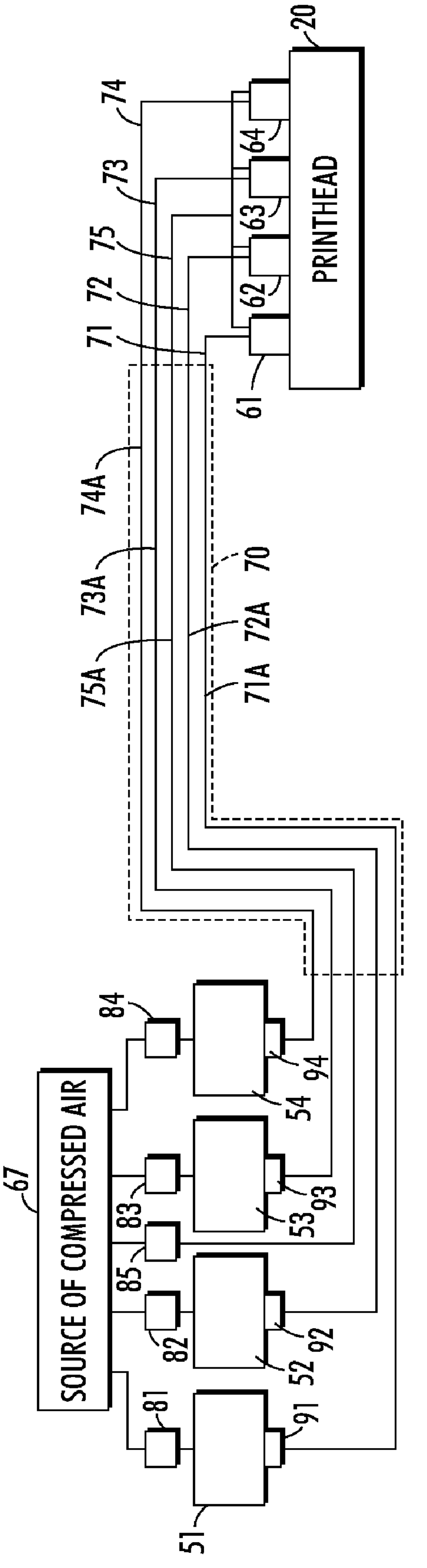
FIG. 3 is a schematic block diagram of an embodiment of ink delivery components of the ink jet printing apparatus of FIGS. 1 and 2.

FIGS. 1 and 3 are schematic block diagrams of an embodiment of an ink jet printing apparatus that includes a controller 10 and a printhead 20 that can include a plurality of drop emitting drop generators for emitting drops of ink 33 onto a print output medium 15. A print output medium transport mechanism 40 can move the print output medium relative to the printhead 20. The printhead 20 receives ink from a plurality of on-board ink reservoirs 61, 62, 63, 64 which are attached to the printhead 20. The on-board ink reservoirs 61-64 respectively receive ink from a plurality of remote ink containers 51, 52, 53, 54 via respective ink supply channels 71, 72, 73, 74.

The ink jet printing apparatus includes an ink delivery system (not shown in FIGS. 1-3) for supplying ink to the remote ink containers 51-54. In one embodiment, the ink jet printing apparatus is a phase change ink imaging device. Accordingly, the ink delivery system comprises a phase change ink delivery system that has at least one source of at least one color of phase change ink in solid form. The phase change ink delivery system also includes a melting and control apparatus (not shown) for melting or phase changing the solid form of the phase change ink into a liquid form and delivering the melted phase change ink to the appropriate remote ink container.

The remote ink containers 51-54 are configured to communicate melted phase change ink held therein to the on-board ink reservoirs 61-64. In one embodiment, the remote ink containers 51-54 may be selectively pressurized, for example by compressed air that is provided by a source of compressed air 67 via a plurality of valves 81, 82, 83, 84. The flow of ink from the remote containers 51-54 to the on-board reservoirs 61-64 can be under pressure or by gravity, for example. Output valves 91, 92, 93, 94 may be provided to control the flow of ink to the on-board ink reservoirs 61-64.

The on-board ink reservoirs 61-64 may also be selectively pressurized, for example by selectively pressurizing the remote ink containers 51-54 and pressurizing an air channel 75 via a valve 85. Alternatively, the ink supply channels 71-74 can be closed, for example by closing the output valves 91-94, and the air channel 75 can be pressurized. The on-board ink reservoirs 61-64 can be pressurized to perform a cleaning or purging operation on the printhead 20, for example. The on-board ink reservoirs 61-64 and the remote ink containers 51-54 can be configured to contain melted solid ink and can be heated. The ink supply channels 71-74 and the air channel 75 can also be heated.

The on-board ink reservoirs 61-64 are vented to atmosphere during normal printing operation, for example by controlling the valve 85 to vent the air channel 75 to atmosphere. The on-board ink reservoirs 61-64 can also be vented to atmosphere during non-pressurizing transfer of ink from the remote ink containers 51-54 (i.e., when ink is transferred without pressurizing the on-board ink reservoirs 61-64).

Figure 2:
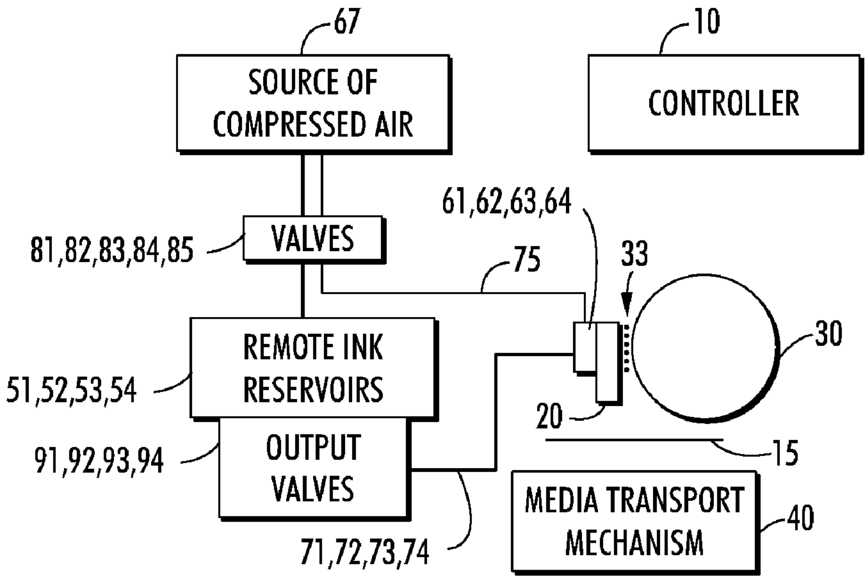
FIG. 2 is a schematic block diagram of another embodiment of an ink jet printing apparatus that includes on-board ink reservoirs.

FIG. 2 is a schematic block diagram of an embodiment of an ink jet printing apparatus that is similar to the embodiment of FIG. 1, and includes a transfer drum 30 for receiving the drops emitted by the printhead 20. A print output media transport mechanism 40 rollingly engages an output print medium 15 against the transfer drum 30 to cause the image printed on the transfer drum to be transferred to the print output medium 15.

As schematically depicted in FIG. 3, a portion of the ink supply channels 71-74 and the air channel 75 can be implemented as conduits 71A, 72A, 73A, 74A, 75A in a multi-conduit cable 70.

Once pressurized ink reaches an on-board reservoir of a printhead, it is typically passed through a filter prior to being collected in a chamber or tank in the on-board reservoir that is configured to communicate the ink to the ink jets for ejection onto a print medium (FIG. 1) or an intermediate transfer member such as transfer drum 30 (FIG. 2). As mentioned above, in transient conditions such as power-on or waking from sleep mode, trapped air may be forced through the filters in the on-board reservoirs along with molten ink creating foam which can overfill the ink tanks or chambers of the on-board reservoirs, mixing ink colors and clogging air paths. Foam can also cause ink level sensors in the tanks or chambers to misread or misinterpret ink levels and/or partially or completely block ink jets of the printhead causing intermittent, weak or missing jets (IWM's).

In order to reduce or eliminate foam formation in the printhead reservoir caused by pressurized ink delivery through the reservoir filter, the present disclosure proposes a reservoir assembly that may be used to implement the on-board reservoirs 61, 62, 63, 64 that provides a series of foam reducing passages, openings, or paths within the on-board reservoirs between the reservoir filters and the ink tanks or chambers of the on-board reservoirs that are designed to collapse, compress, stretch, and/or shear the air bubbles that make up the foam before the foam enters the ink tanks of the reservoir assembly. The foam reducing paths may be formed by features in the plates that make up the reservoir assembly between the filters and the ink tanks of the on-board reservoirs that have at least one characteristic that enable the paths to collapse, compress, stretch, and/or shear air bubbles that make up foam that enter the ink supply path prior to the foam reaching the reservoir tanks. Examples of characteristics that enable the foam reducing paths to collapse and or shear air bubbles in foam that enters the paths include changes in aspect ratio, reduction in the cross-sectional area of the paths as the ink/foam travels along the paths, and relatively sharp edges along the path. In addition, although the present discussion is directed primarily to the utilization of foam reducing ink passages in printhead reservoir assemblies of phase change ink imaging devices, such foam reducing passages may be utilized to reduce or prevent foam formation in printheads that utilize other forms of marking material, such as, for example, aqueous inks, oil based inks, UV curable inks, and the like. Therefore, references to phase change ink and phase change ink printheads utilized herein should not be taken to limit the present disclosure in any manner.

Figure 4:
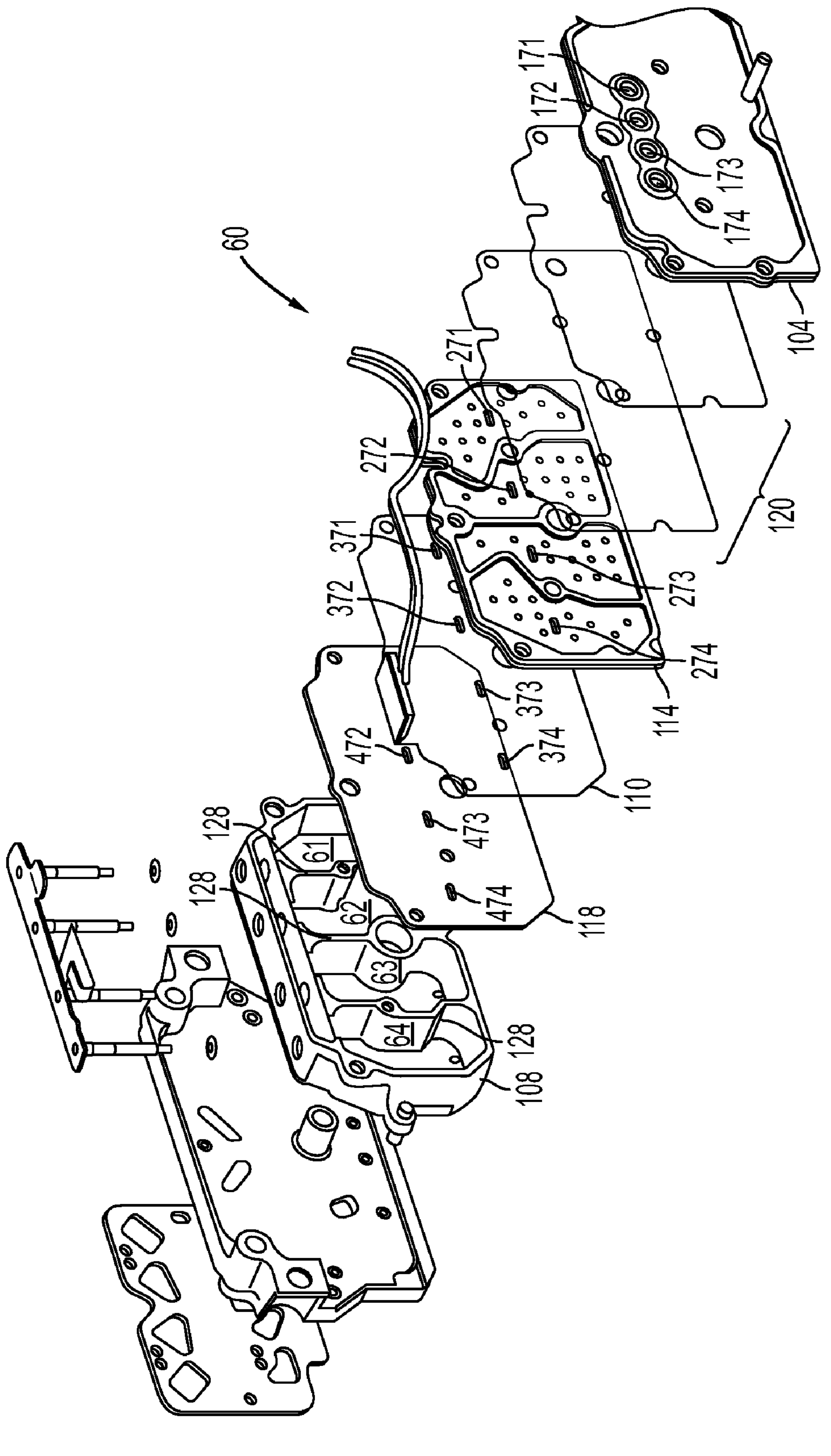
FIG. 4 is an exploded perspective view of the plates that form one embodiment of the on-board reservoirs of FIGS. 1-3.
Figure 5:
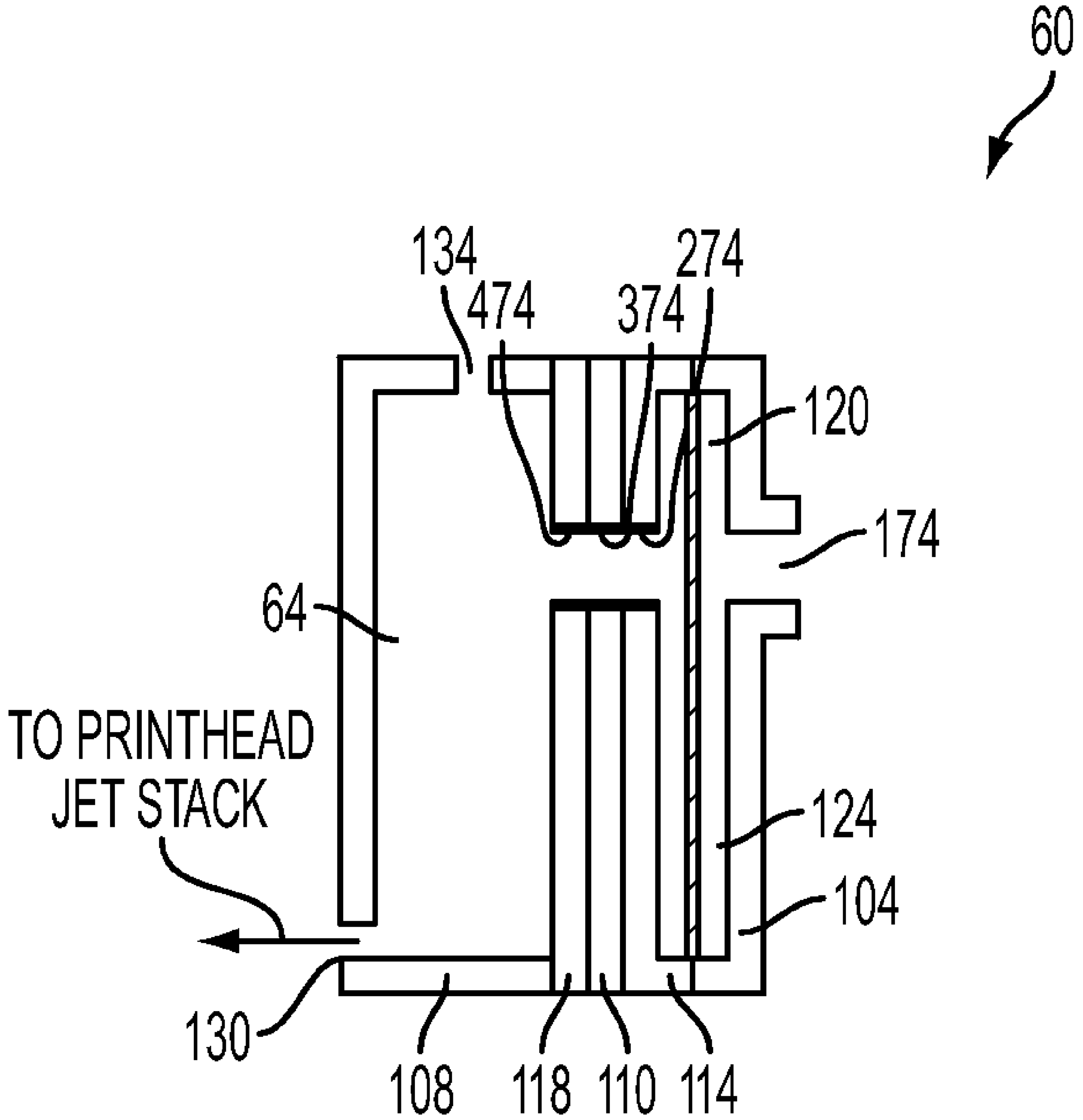
FIG. 5 is a side cross-sectional view of the on-board ink reservoir of FIG. 4.

FIGS. 4 and 5 depict an embodiment of a reservoir assembly 60 that for implementing the on-board reservoirs 61, 62, 63, 64. The reservoir assembly 60 is formed of a plurality of plates or panels that are assembled to form a housing that contains ink tanks and ink supply paths. In one embodiment, the reservoir assembly includes a back panel or plate 104 and a front panel or plate 108. Located between the back panel 104 and the front panel 108 is a filter assembly 120, and then a heater sheet or panel 110 sandwiched between a first heat distribution plate 114 and a second heat distribution plate 118. The back panel 104 can generally comprise a rear portion of the reservoir assembly which 60 receives ink from the remote ink containers 51-54, while the front panel 108 includes the reservoirs 61-64 that feed the ink jets of the printhead.

The heater 110 includes heating elements that may be in the form of a resistive heat tape, traces, or wires that generate heat in response to an electrical current flowing therethrough. The heating elements may be covered on each side by an electrical insulation having thermal properties that enable the generated heat to be transferred to the plates of the reservoir assembly in adequate quantities to maintain or heat the phase change ink contained therein to an appropriate temperature. In one embodiment, the heater 110 is a Kapton heater made in a manner described in more detail below. Alternate heater materials and constructions, such as a silicone heater, may be used for different temperature environments, or to address cost and geometry issues for the construction of other embodiments of umbilical assemblies.

The back plate 104, the first heater plate 114, the second heater plate 118, the filter assembly 120, and the front plate 108 may each be formed a thermally conductive material, such as stainless steel or aluminum, and may be bonded or sealed to each other in any suitable manner, such as by, for example, a pressure sensitive adhesive or other suitable adhering or bonding agent. The heater 110 includes heating elements that may be in the form of a resistive heat tape, traces, or wires that generate heat in response to an electrical current flowing therethrough. The heating elements may be covered on each side by an electrical insulation material, such as polyimide, having thermal properties that enable the generated heat to be transferred to the plates of the reservoir assembly in adequate quantities to maintain or heat the phase change ink contained therein to an appropriate temperature. In one embodiment, the heater is configured to generate heat in a uniform gradient to maintain ink in the reservoir assembly within a temperature range of about 100 degrees Celsius to about 140 degrees Celsius. The heater 110 may also be configured to generate heat in other temperature ranges. The heater 110 is capable of generating enough heat to enable the reservoir assembly to melt phase change ink that has solidified within the passages and chambers of the reservoir assembly, as may occur when turning on a printer from a powered down state.

To keep the heater 110 from self-destructing from high localized heat, the heater may be coupled to a thermally conductive strip to improve thermal uniformity along the heater length. The thermal conductor may be a layer or strip of aluminum, copper, or other thermally conductive material that is placed over at least one side of the electrically insulated heating traces. The thermal conductor provides a highly thermally conductive path so the thermal energy is spread quickly and more uniformly over the mass. The rapid transfer of thermal energy keeps the trace temperature under limits that would damage, preventing excess stress on the traces and other components of the assembly. Less thermal stress results in less thermal buckling of the traces, which may cause the layers of the heater to delaminate.

After the heater 110 has been constructed, the first heat distribution plate 114 is adhered or bonded to one side of the heater 110. The first heat distribution plate 114 may be adhesively bonded to the heater using a double-sided pressure sensitive adhesive (PSA). Likewise, the second heat distribution plate 118 of the reservoir assembly is adhered or bonded to the other side of the heater 110. This construction enables a single heater to be used to generate heat in the substantially the entire reservoir assembly to maintain the ink within the reservoirs at a desired temperature. In one embodiment, the heater is configured to generate heat in a uniform gradient to maintain ink in the reservoir assembly within a temperature range of about 100 degrees Celsius to about 140 degrees Celsius. The heater 110 may also be configured to generate heat in other temperature ranges. The heater is capable of melting phase change ink that has solidified within the passages and chambers of the reservoir assembly, as may occur when turning on a printer from a powered down state.

Generally, the ink travels from the rear plate 104 towards the front plate 108. The rear panel includes input ports 171, 172, 173, 174 that are respectively connected to the supply channels 71, 72, 73, 74 to receive ink therethrough from the associated remote ink containers 51-54 (FIGS. 1-3). Ink received via an input port is directed to a filter chamber that is formed by the adjacently positioned rear plate and first heater plate. As depicted in FIG. 5, the rear panel 104 and/or first heater plate 114 may include recesses, cavities, and/or walls that define the filter chambers 124. Each filter chamber 124 is configured to receive ink via one of the input ports 171-174 (port 174 in FIG. 5). A vertical filter assembly 120 is sandwiched between and is situated substantially parallel to the rear plate 104 and the first heater plate 114. The filter assembly generally prevents particulates from getting into the ink and causing problems with the jetting process. Particulates may clog the jets, causing them to fail or fire off axis. A vertical filter allows for a more compact print head reservoir; however, the filter can be situated at other angles as opposed to vertical. Also, the filter is very fine, so to decrease the pressure drop across the filter the surface area of the filter is maximized. A filter that is at an angle to horizontal provides a larger surface area. The filters of the filter assembly may be bonded or adhered to one of the rear panel and first heat distribution plate in any suitable manner. Alternatively, the filters of the filter assembly may be held in place by molded or otherwise formed features in the rear panel and/or first heat distribution plate, such as slots or grooves.

In the embodiment of FIGS. 4 and 5, the first heater plate 114 comprises a weir plate that includes openings 271, 272, 273, 274 that are positioned at an upper location in each of the filter chambers 124 incorporated into the reservoir assembly. The openings 271-274 in the first heater plate comprise the entrance to the foam reducing ink supply paths. The heater 110 and the second heater plate 118 include corresponding openings that align with the openings in the first heater plate/weir plate to form the rest of the foam reducing ink supply paths. For example, as depicted in FIG. 4, the second heater plate 118 includes ink path openings 472-474, and the heater includes ink path openings 371-374. The ink path opening in the second heater plate 118 that aligns with opening 371 is obstructed from view by a portion of the heater 110.

The foam reducing ink supply paths formed by the openings in the heater and first and second heater plates guide ink received in the filter chambers 124 to an associated reservoir, or tank, 61-64 incorporated into the front panel 108, referred to herein as a tank plate. As depicted in FIG. 4, the front panel includes a plurality of tank walls 128 that extend toward the second heater plate 118 and cooperate therewith to define the reservoirs 61-64. The reservoirs 61-64 hold the ink until the printhead activates and draws ink through outlet openings in the reservoirs 61-64 that direct the ink to a jet stack where the ink may be ejected. Each reservoir includes a vent 134 that enables the reservoirs to self-regulate pressure. The jets can then draw the ink through the channel 130 without experiencing the pressure drop. In addition, the reservoir vent may be operably coupled to the air channel 75 (FIGS. 1-3) so that a positive pressure may be introduced into the reservoirs 61-64 to perform a cleaning or purging operation on the printhead.

During pressurized ink delivery to the reservoir assembly, ink will fill a respective filter chamber 124, pass through the filter(s) 120 positioned in the filter chamber 124, and be directed to the foam reducing ink supply path opening in the first heater/weir plate. The position of the ink supply path openings 271-274 in the first heater plate 114 act as a weir over which the ink travels into the corresponding reservoir 61-64 in the front plate 108. The openings 271-274 in the first heater plate 114 act to constrict or reduce the cross-section of flow from the filter chamber 124 toward the ink tanks 61-64 which enables the first heater plate openings 271-274 to collapse or shear many of the largest air bubbles that make up any foam that may have formed.

Figure 6:
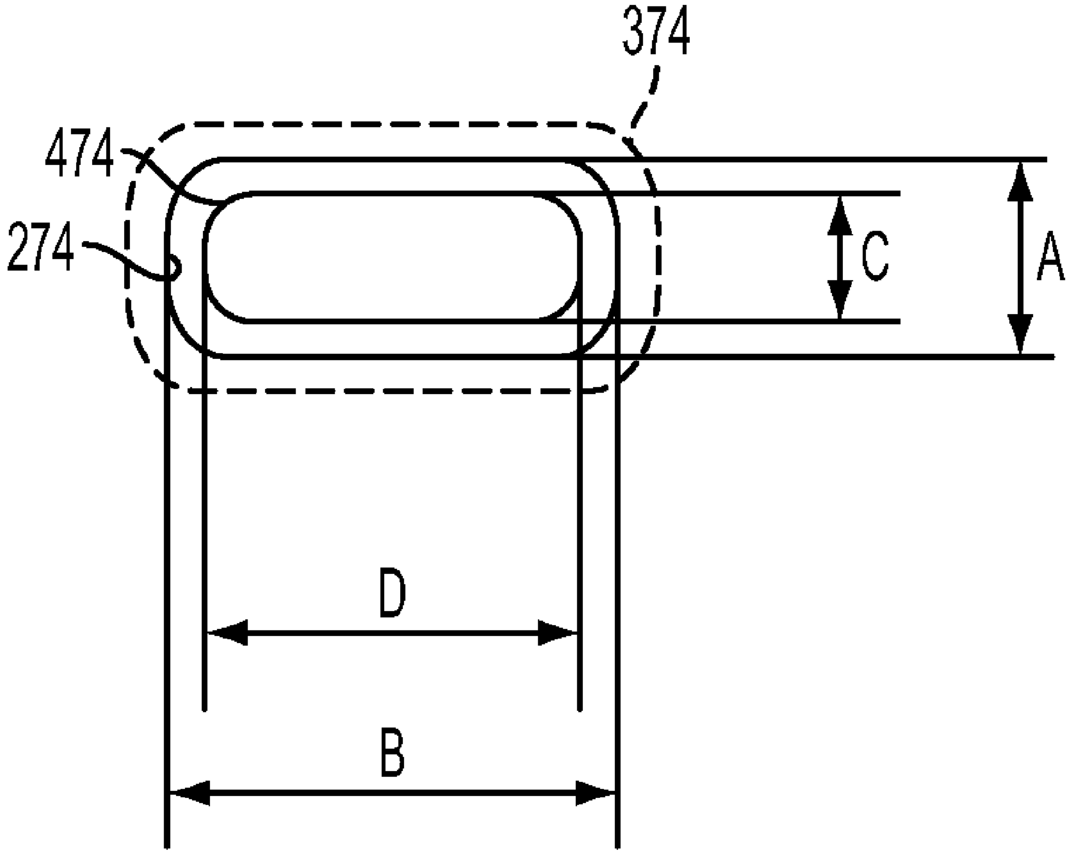
FIG. 6 is a view of a foam reducing ink supply path opening looking into the opening.

The openings 271-274 in the first heater plate may have any suitable shape and/or size such as circles, squares, ellipses, and rectangles, may have rounded or straight edges, and may be regularly or irregularly shaped. The ability of the ink supply path openings in the first heater plate to collapse or shear air bubbles as they enter the ink supply paths corresponds to the dimensions of the openings. The openings in the first heater plate may be provided with a shape or aspect ratio that enhances the ability of the openings to collapse or shear foam bubbles. For example, ink supply path openings in the first heater plate may be provided with elongated slot-like shapes such as elongated circles, ellipses or rectangles. FIG. 6 is view looking into a particular embodiment of a foam reducing ink supply path in a direction from the filter chamber 124 toward the ink tanks. As seen in FIG. 6, the ink supply path opening 274 in the first heater plate 114 have an elongated shape. In particular, the ink supply path opening 274 in the first heater plate has a first dimension A corresponding to the width of the openings between the long sides of the openings and a second dimension B corresponding to the width of the openings between the shorter sides of the opening 274. The first dimension A is narrower than the second dimension B. As can be determined by a person of ordinary skill in the art, the slot shaped openings in the first heater plate are capable of collapsing, compressing, or shearing air bubbles that have a diameter greater than the first dimension, or narrower dimension, of the openings.

After ink and/or foam have passed through the foam reducing opening in the first heater, the flow is directed through the opening 374 in the heater. The openings 371-374 in the heater are typically larger than the openings 271-274 in the first and second 471-474 heater plates by design for manufacturing processes. The flow of ink foam then continues along the respective foam reducing ink supply path where it is directed through the openings 474 in the second heater plate. In order to further reduce or eliminate foam that enters the ink supply paths through the ink supply path openings in the first heater plate, the second heater plate 118 comprises a foam plate having openings 471-474 that are smaller in at least one dimension or aspect than the ink supply path openings 271-274 in the first heater plate 114 in order to further reduce the cross-section of flow along the paths. The reduction in the cross-section of flow through the second heater/foam plate acts to collapse or shear more of the air bubbles of the foam that were permitted to pass through the openings in the first heater plate prior to the foam reaching the tanks.

In the embodiment of FIGS. 4-6, the openings in the foam plate are shaped generally the same as the openings in the first heater plate only smaller. The foam plate openings, however, may have other shapes. In particular, the ink supply path openings in the foam plate have a first dimension C corresponding to the width of the openings between the long sides of the openings and a second dimension D corresponding to the width of the openings between the shorter sides of the opening. The first dimension C of the openings in the foam plate is less than the second dimension D while both the first C and the second dimensions D of the foam plate openings 471-474 are less than the first A and the second dimensions B, respectively, of the openings 271-274 in the first heater plate 114. The ink supply path openings 471-474 in the foam plate 118, however, may have any suitable shape and/or size so long as the openings act to reduce the cross-section of the flow through the foam reducing paths in order to collapse or shear at least some of the air bubbles in any foam that enters the ink supply paths prior to the foam reaching ink tanks in the front plate. Although the reservoir assembly described above includes a single foam plate for reducing the cross-section of flow downstream from the openings in the first heater plate, multiple foam plates may be utilized that, for example, progressively reduce the cross-section of the flow along the supply paths.

To further enhance the ability of the foam reducing openings 471-474 in the foam plate 118 to collapse or shear bubbles passing therethrough, the foam plate may be provided as a thin or narrow plate so that the edges (FIG. 5) of the openings in the foam plate are relatively "sharp." For example, in the embodiments of FIGS. 4-6, the foam plate 118 may have a thickness from about 0.1 mm to about 1 mm although any suitable thickness for the foam plate may be utilized. A thin edge at the openings 471-474 through the foam plate may enable the edge to pierce and collapse air bubbles more readily than a thicker edge. As used herein, the edge of an opening refers to the interior wall(s) of the opening that extend between the planar surfaces of the plate in which the opening is formed.

Figure 7:
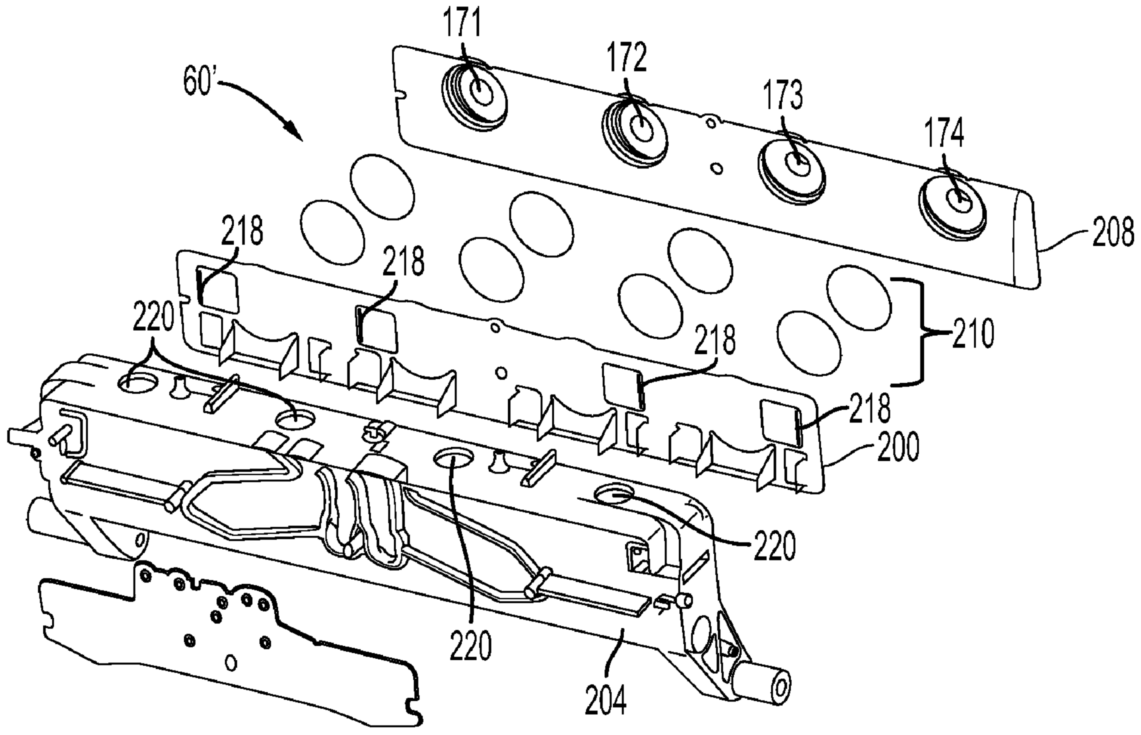
FIG. 7 is an exploded perspective view of another embodiment of a reservoir assembly that includes a foam plate.
Figure 8:
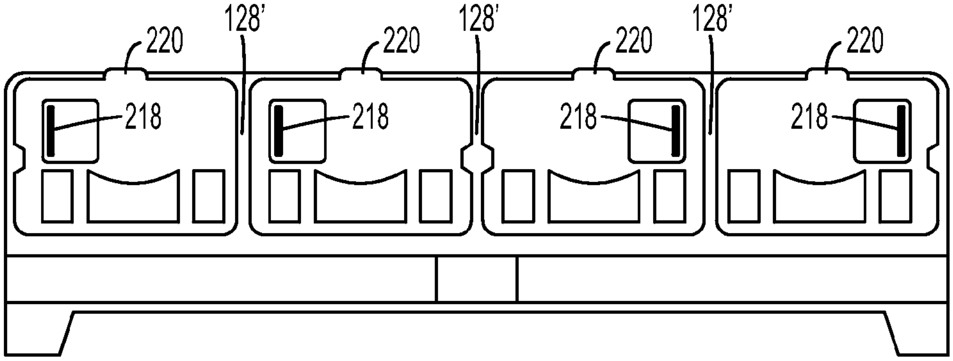
FIG. 8 is a front cross-sectional view of the reservoir assembly of FIG. 7 showing the foam plate.
Figure 9:
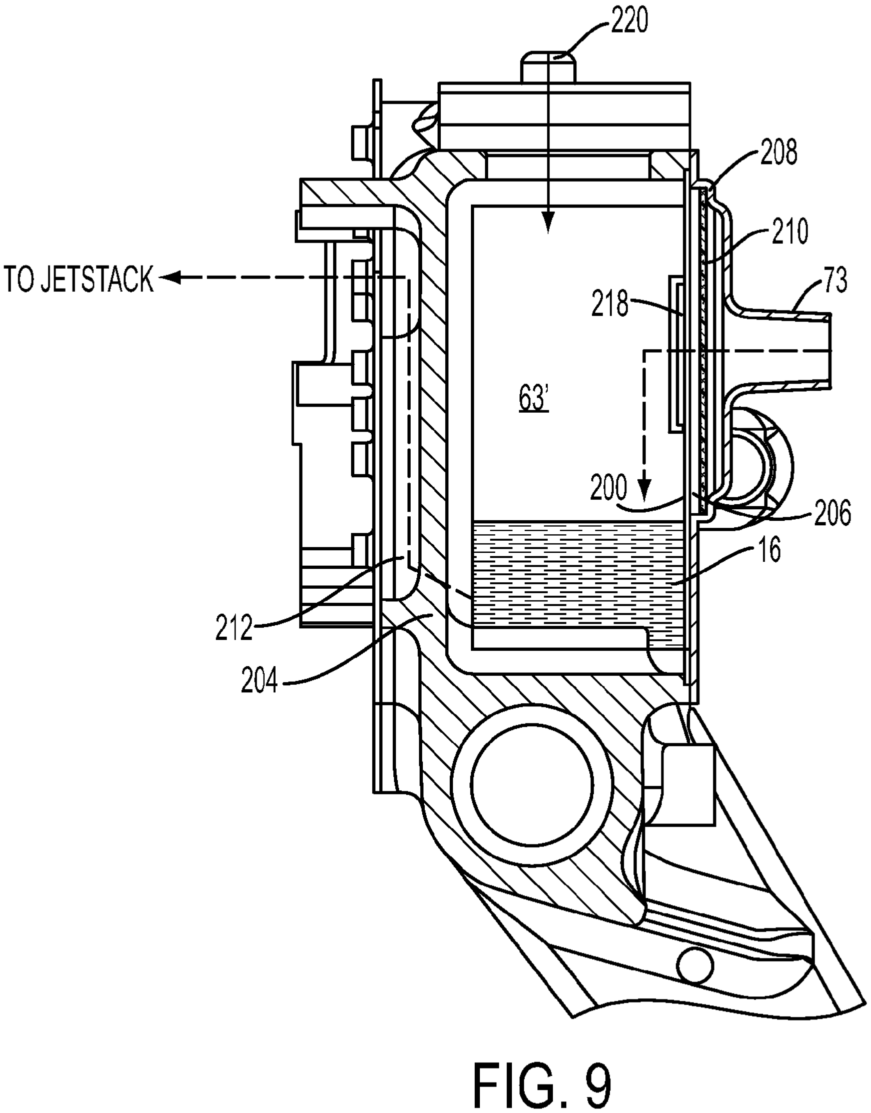
FIG. 9 is a side cross-sectional view of the reservoir assembly of FIG. 7.

Foam plates may be incorporated into other embodiments of printhead reservoirs to reduce foam that may be formed during pressurized ink delivery through a filter. For example, FIGS. 7-9 show an alternative embodiment of a reservoir assembly 60' that includes a foam plate 200 positioned between a front plate 204 and a back plate 208. As depicted in FIGS. 7 and 9, the back plate 208 includes input ports 171, 172, 173, 174 that may be connected to supply channels such as supply channels 71, 72, 73, 74 of FIGS. 1-3 to receive ink. The reservoir assembly 60' includes filters 210 that are in the form of filter discs that may be bonded to the back plate 208 in any suitable manner such as by a silicone adhesive. The foam plate 200 is positioned adjacent the back plate 208 to form filter chambers 206 around the filter discs and includes narrow channels, exiting openings, or slits, 218 that are positioned to constrict the flow of ink foam that passes through the filter chambers and corresponding filter discs. The channels and slits 218 in the foam plate 200 direct the flow of ink 16 into an associated reservoir, or tank, 63' as shown in FIG. 9, incorporated into the front plate 204. Similar to FIG. 4, the front plate 204 includes a plurality of tank walls 128' (FIG. 8) that extend toward the foam plate 200 and back plate 208 that define the on-board ink tanks. The tanks, such as tank 63' of FIG. 9, hold the ink 16 until the printhead activates and draws ink into supply channels 212 that direct the ink to a jet stack (not shown) where the ink may be ejected. Each reservoir includes a vent 220 that enables the reservoirs to self-regulate pressure so the jet stack can draw ink through the channels 212 without experiencing pressure drop. In addition, the reservoir vents 220 may be operably coupled to the air channel 75 (FIGS. 1-3) so that a positive pressure may be introduced into the tanks to perform a cleaning or purging operation on the printhead 20.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A reservoir assembly for use in an imaging device, the reservoir assembly including:

a back plate including an ink input port configured to receive liquid ink under pressure from an ink source;

a front plate including an ink tank configured to hold ink received from the ink source and to communicate the ink to a printhead;

a first intermediate plate bonded to the back plate, the first intermediate plate and the back plate enclosing a filter chamber therebetween, the filter chamber being configured to receive ink via the ink input port and to direct the received ink to an ink supply path opening in the first intermediate plate having a first cross-sectional area, the filter chamber including at least one filter positioned between the ink input port and the ink supply path opening in the first intermediate plate; and a second intermediate plate bonded between the first intermediate plate and the front plate, the second intermediate plate including an ink supply path opening that aligns with the ink supply path opening in the first plate, the ink supply path opening in the second intermediate plate having a second cross-sectional area, the second cross-sectional area being less than the first cross-sectional area.

2. The reservoir assembly of claim 1, further comprising a heater positioned between the first intermediate plate and the second intermediate plate, the heater including an ink supply path opening that aligns with the ink supply path openings in the first and the second intermediate plates, the heater being configured to generate heat in the reservoir assembly to maintain solid ink contained in the filter chamber, the ink supply path, and the ink tank in melted form.

3. The reservoir assembly of claim 2, the heater being configured to generate sufficient heat to maintain solid ink contained in the filter chamber, the ink supply path, and the ink tank between 90° C. and 140° C.

4. The reservoir assembly of claim 3, the first and the second intermediate plates each being formed of a thermally conductive material and thermally coupled to the heater.

5. The reservoir assembly of claim 4, the first intermediate plate comprising a weir plate.

6. The reservoir assembly of claim 5, the ink supply path opening in the first intermediate plate having an elongated shape.

7. The reservoir assembly of claim 1, the back plate including a plurality of ink input ports, the front plate including an ink tank for each ink input port, the first intermediate plate, and the second intermediate plate each including an ink supply path opening for each ink input port that aligns with the corresponding ink supply path openings to form an ink supply path configured to guide ink from the respective ink input port to the corresponding ink tank.

8. A reservoir assembly for use in an imaging device, the reservoir assembly including:

a back plate including an ink input port configured to receive liquid ink from an ink source;

a front plate including an ink tank configured to hold ink received from the ink source and to enable the ink to flow from the ink tank to a printhead; and a foam plate positioned between the front plate and the back plate, the foam plate and the back plate enclosing a filter chamber therebetween, the filter chamber being configured to receive ink via the ink input port, the foam plate including a thin channel that exits at a slit configured to be smaller in at least one dimension than the ink input port to constrict a flow of ink from the filter chamber to the ink tank, the filter chamber including at least one filter positioned between the ink input port and the slit in the foam plate.

9. The reservoir assembly of claim 8, further comprising a heater configured to generate heat in the reservoir assembly to maintain solid ink contained in the filter chamber and the ink tank in melted form.

10. The reservoir assembly of claim 9, the heater being configured to generate sufficient heat to maintain solid ink contained in the filter chamber, the ink supply path, and the ink tank between 90° C. and 140° C.

11. The reservoir assembly of claim 10, the back plate including a plurality of ink input ports, the front plate including an ink tank for each ink input port, the foam plate and the back plate enclosing a filter chamber therebetween for each ink input port, the foam plate including a thin channel, exiting that exits at a slit corresponding to each filter chamber configured to constrict a flow of ink the respective ink input port to the corresponding ink tank.

12. A reservoir assembly for use in an imaging device, the reservoir assembly including:

a back plate including an ink input port configured to receive liquid ink under pressure from an ink source;

a front plate including an ink tank configured to hold ink received from the ink source and to communicate the ink to a printhead;

a weir plate bonded to the back plate, the weir plate and the back plate enclosing a filter chamber therebetween, the filter chamber being configured to receive ink via the ink input port and to direct the received ink to an ink supply path opening in the weir plate having a first cross-sectional area, the filter chamber including at least one filter positioned between the ink input port and the ink supply path opening in the weir plate; and a foam plate bonded between the weir plate and the front plate, the foam plate including an ink supply path opening that aligns with the ink supply path opening in the weir plate, the ink supply path opening in the foam plate having a second cross-sectional area, the second cross-sectional area being less than the first cross-sectional area.

13. The reservoir assembly of claim 12, further comprising a heater positioned between the foam plate and the weir plate, the heater including an ink supply path opening that aligns with the ink supply path openings in the foam plate and the weir plate, the heater being configured to generate heat in the reservoir assembly to maintain solid ink contained in the filter chamber, the ink supply path, and the ink tank in melted form.

14. The reservoir assembly of claim 13, the heater being configured to generate sufficient heat to maintain solid ink contained in the filter chamber, the ink supply path, and the ink tank between 90° C. and 140° C.

15. The reservoir assembly of claim 14, the foam plate and the weir plates each being formed of a thermally conductive material and thermally coupled to the heater.

* * * * *